US010963280B2

(12) United States Patent
Kaplan et al.

(10) Patent No.: US 10,963,280 B2
(45) Date of Patent: Mar. 30, 2021

(54) HYPERVISOR POST-WRITE NOTIFICATION OF CONTROL AND DEBUG REGISTER UPDATES

(71) Applicant: Advanced Micro Devices, Inc., Sunnyvale, CA (US)

(72) Inventors: David A. Kaplan, Austin, TX (US); Joel Howard Schopp, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 160 days.

(21) Appl. No.: 15/014,977

(22) Filed: Feb. 3, 2016

(65) Prior Publication Data

US 2017/0220369 A1 Aug. 3, 2017

(51) Int. Cl.
*G06F 9/455* (2018.01)
*G06F 12/1045* (2016.01)

(52) U.S. Cl.
CPC ...... *G06F 9/45558* (2013.01); *G06F 12/1045* (2013.01); *G06F 2009/45579* (2013.01); *G06F 2009/45591* (2013.01); *G06F 2212/50* (2013.01)

(58) Field of Classification Search
None
See application file for complete search history.

(56) References Cited

U.S. PATENT DOCUMENTS

| 4,718,008 | A | 1/1988 | Chang et al. |
| 5,303,378 | A | 4/1994 | Cohen |
| 5,522,075 | A | 5/1996 | Robinson et al. |
| 5,822,778 | A | 10/1998 | Dutton et al. |
| 5,826,084 | A | 10/1998 | Brooks et al. |
| 6,061,711 | A | 5/2000 | Song et al. |
| 6,785,886 | B1 | 8/2004 | Lim et al. |
| 7,209,994 | B1 | 4/2007 | Klaiber et al. |
| 7,818,808 | B1 * | 10/2010 | Neiger ............ G06F 12/145 703/27 |

(Continued)

OTHER PUBLICATIONS

Xia, Yubin, et al, Architecture Support for Guest-Transparent VM Protection from Untrusted Hypervisor and Physical Attacks, Feb. 2013, IEEE, High Performance Computer Architecture.*
"Intel® 64 and IA-32 Architectures Software Developer's Manual—vol. 3B: System Programming Guide, Part 2", Intel Corporation, May 2007, 6 pages.
Waldspurger, Carl A., "Memory Resource Management in VMware ESX Server", Proceedings of the 5th Symposium on Operating Systems Design and Implementation, Dec. 21, 2002, pp. 181-194, vol. 36, ACM, New York, New York, USA.

(Continued)

*Primary Examiner* — Kenneth Tang
(74) *Attorney, Agent, or Firm* — Kowert Hood Munyon Rankin and Goetzel PC; Rory D. Rankin

(57) ABSTRACT

Systems, apparatuses, and methods for implementing hypervisor post-write notification of processor state register modifications. A write to a state register of the processor may be detected during guest execution. In response to detecting the write to the state register, the processor may trigger microcode to perform the write and copy the new value of the register to a memory location prior to exiting the guest. The hypervisor may be notified of the update to the state register after it occurs, and the hypervisor may be prevented from modifying the value of the guest's state register. The hypervisor may terminate the guest if the update to the state register is unacceptable. Alternatively, the hypervisor may recommend an alternate value to the guest. If the guest agrees, the guest may set the state register to the alternate value recommended by the hypervisor when the guest resumes operation.

17 Claims, 7 Drawing Sheets

(56) References Cited

U.S. PATENT DOCUMENTS

| | | | | |
|---|---|---|---|---|
| 7,937,700 | B1* | 5/2011 | Klaiber | G06F 9/45533 711/106 |
| 8,032,897 | B2 | 10/2011 | Serebrin | |
| 8,078,792 | B2 | 12/2011 | Serebrin et al. | |
| 8,099,541 | B2 | 1/2012 | Serebrin | |
| 8,127,098 | B1 | 2/2012 | Klaiber et al. | |
| 8,561,060 | B2 | 10/2013 | Serebrin et al. | |
| 8,561,137 | B2* | 10/2013 | Sabin | G06F 21/53 718/1 |
| 9,619,346 | B2* | 4/2017 | Pape | G06F 11/1484 |
| 2003/0037089 | A1* | 2/2003 | Cota-Robles | G06F 9/4881 718/1 |
| 2003/0217250 | A1 | 11/2003 | Bennett et al. | |
| 2004/0003324 | A1 | 1/2004 | Uhlig et al. | |
| 2004/0117532 | A1 | 6/2004 | Bennett et al. | |
| 2005/0081199 | A1 | 4/2005 | Traut | |
| 2005/0091652 | A1 | 4/2005 | Ross et al. | |
| 2006/0010440 | A1* | 1/2006 | Anderson | G06F 9/45533 718/1 |
| 2006/0206892 | A1 | 9/2006 | Vega et al. | |
| 2007/0106986 | A1 | 5/2007 | Worley, Jr. | |
| 2007/0234358 | A1 | 10/2007 | Hattori et al. | |
| 2008/0082722 | A1 | 4/2008 | Savagaonkar et al. | |
| 2009/0006805 | A1 | 1/2009 | Anderson et al. | |
| 2009/0113111 | A1 | 4/2009 | Chen et al. | |
| 2009/0187698 | A1* | 7/2009 | Serebrin | G06F 9/455 711/6 |
| 2009/0187726 | A1 | 7/2009 | Serebrin et al. | |
| 2013/0014102 | A1* | 1/2013 | Shah | G06F 9/45558 718/1 |
| 2013/0097392 | A1* | 4/2013 | Arges | G06F 9/468 711/152 |
| 2014/0082699 | A1* | 3/2014 | Eicken | G06F 21/53 726/4 |
| 2017/0109197 | A1* | 4/2017 | Coleman | G06F 9/4812 |

OTHER PUBLICATIONS

Waldspurger, Carl A., "Memory Resource Management in VMware ESX Server", VMware Inc., OSDI '02 Presentation, Dec. 10, 2002, 24 pages.

"XenFaq—Xen Wiki", http://wiki.xensource.com/xenwiki/XenFaq?action=print, 15 pages, 2007. [Retrieved Jul. 13, 2007].

Barham, et al., "Xen and the Art of Virtualization," SOSP '03 Proceedings of the Nineteenth ACM Symposium on Operating Systems Principles, Oct. 19-22, 2003, 14 pages, ACM, New York, New York, USA.

Adams, et al., "A Comparison of Software and Hardware Techniques for x86 Virtualization", Proceedings of the 12th International Conference on Architectural Support for Programming Languages and Operating Systems, Oct. 21-25, 2006, 12 pages, ACM, New York, New York, USA.

"AMD64 Technology—AMD64 Architecture Programmer's Manual vol. 2: System Programming", AMD, Publication 24593, Revision 3.12, Sep. 2006, pp. 355-411.

Gum, P.H, "System/370 Extended Architecture: Facilities for Virtual Machines", IBM Journal of Research and Development, vol. 27, No. 6, Nov. 1983, pp. 530-544.

Turley, James L., "Chapter 9: 8086 Emulation", Advanced 80386 Programming Techniques, 1988, pp. 283-315, McGraw-Hill, Berkely, CA, USA.

International Search Report and Written Opinion in International Application No. PCT/US2009/00410, dated Oct. 16, 2009, 10 pages.

Non-Final Office Action in U.S. Appl. No. 11/740,463, dated Apr. 28, 2011, 16 pages.

Non-Final Office Action in U.S. Appl. No. 12/272,956, dated Mar. 18, 2011, 6 pages.

Non-Final Office Action in U.S. Appl. No. 12/272,955, dated Mar. 18, 2011, 9 pages.

* cited by examiner

HYPERVISOR POST-WRITE NOTIFICATION OF CONTROL AND DEBUG REGISTER UPDATES

BACKGROUND

Technical Field

Embodiments described herein relate to virtualization and more particularly, to allowing guests to make changes to the physical machine state prior to notifying the hypervisor.

Description of the Related Art

Virtualization has been used in computer systems for a variety of different purposes. It is common in virtualization to execute privileged software (programs) in a "container" to prevent the privileged software from directly accessing and/or making changes to at least some of the physical machine state without first being permitted to do so by a virtual machine manager (VMM) (or hypervisor) that controls the virtual machine. Privileged programs may include operating systems, and may also include other software which expects to have full control of the hardware on which the software is executing.

Generally, virtualization of a processor or computer system may include providing one or more privileged programs with access to a virtual machine (the container mentioned above) over which the privileged program has full control, but the control of the physical machine is retained by the hypervisor. The virtual machine may include a processor (or processors), memory, and various peripheral devices that the privileged program expects to find in the machine on which it is executing. The virtual machine elements may be implemented by hardware that the hypervisor allocates to the virtual machine, at least temporarily, and/or may be emulated in software. Each privileged program (and related software in some cases, such as the applications that execute on an operating system) may be referred to herein as a guest or guest program. As used herein, the term "guest execution" generally refers to execution of a guest program during a period of time that a guest program (e.g., application, operating system, process, etc.) has independent access to processor hardware resources and is able to execute code on the processor.

In a common virtualization implementation, the hypervisor is considered fully trusted. Accordingly, the hypervisor has visibility into all of the guest's memory contents, register contents, etc. Additionally, the hypervisor can change the architectural state of the guest at any time, with or without the guest's knowledge. However, in some scenarios, the hypervisor may not be trusted to have control over the architectural state of the guest.

SUMMARY

Systems, apparatuses, and methods for allowing guests to make changes to the processor architectural state prior to notifying the hypervisor are contemplated.

A virtualized computing system with one or more processors may include a hypervisor configured to allocate physical resources of the computing system to one or more guests. In one embodiment, while a guest is running on the system, the guest may attempt to update the architectural state of the processor(s). For example, a guest may attempt to execute a given instruction to perform a write to any of various processor registers (e.g., control registers, debug registers). Traditionally, the processor hardware would prevent the guest from executing the given instruction by causing the guest to exit and then launching the hypervisor to emulate the instruction. However, in one embodiment, instead of preventing the guest from executing the given instruction, the processor may initiate a trap in response to detecting the given instruction. The processor may allow the guest to execute the given instruction, and then the processor may notify the hypervisor after the given instruction has been executed.

For example, in one embodiment, in response to detecting a guest instruction which will perform a write to a first register of the processor, the processor hardware may perform the write to the first register prior to exiting the guest. The first register may be a control register, debug register, or other processor register. Then, the processor may copy the new value of the first register to a location in memory, a separate processor register, or the like. Next, the processor may exit the guest and launch the hypervisor. The hypervisor may read the new value of the first register from the other location and determine if the new value is acceptable. If the new value is acceptable, the hypervisor may allow the guest to continue. If the new value is unacceptable, the hypervisor may respond in any of a variety of ways, depending on the embodiment. For example, in one embodiment, if the new value is unacceptable, the hypervisor may recommend an alternate value to the guest. Alternatively, the hypervisor may request that the guest generate a different value for the first register. Once the guest and the hypervisor have agreed on a value for the first register, the guest may be allowed to proceed. However, the hypervisor may be prevented from unilaterally modifying the value of the first register, although the hypervisor may terminate the guest if an agreement between the hypervisor and the guest on an alternate value cannot be reached.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
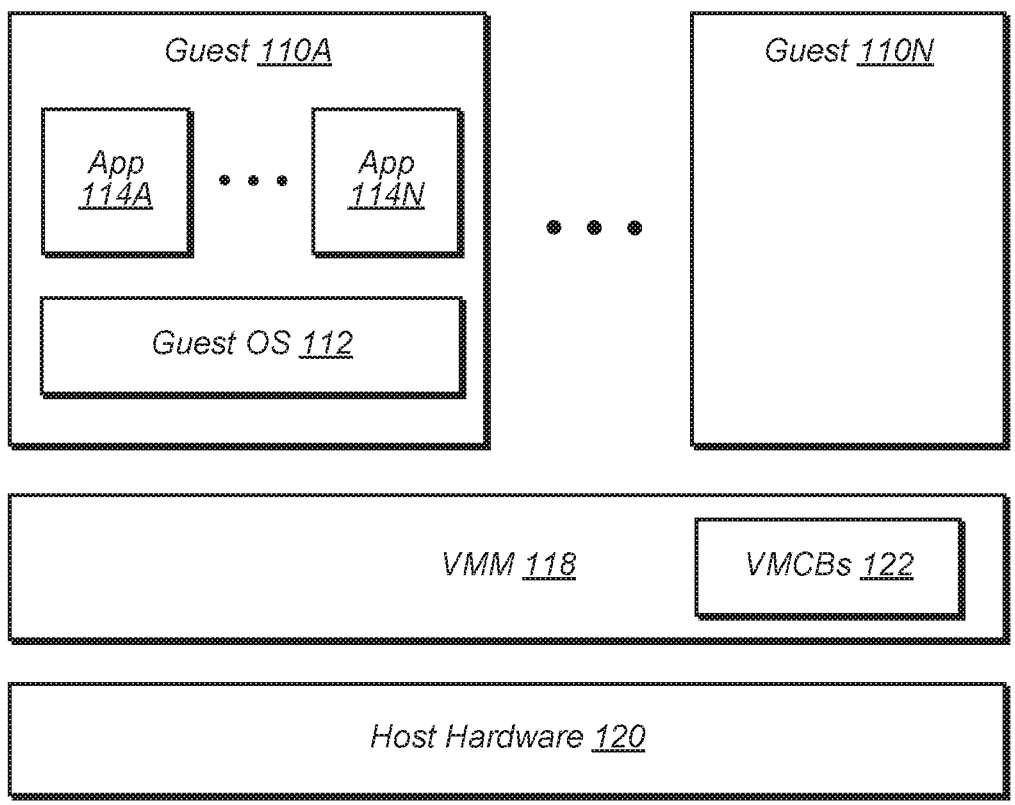
FIG. 1 is a block diagram of one embodiment of a computing system.

Referring now to FIG. 1, a block diagram of one embodiment of a computer system 100 that implements virtualization is shown. In the embodiment of FIG. 1, multiple guests 110A-110N are shown. Guest 110A includes a guest operating system (OS) 112 and one or more applications 114A-114N that run on the guest OS 112. The other guests 110A-110N may include similar software. The guests 110A-110N are managed by a virtual machine manager (VMM) 118. The VMM 118 and the guests 110A-110N execute on host hardware 120, which may include the physical hardware included in the computer system 100. In one embodiment, computer system 100 may be part of a cloud computing environment.

In one embodiment, the VMM 118 and guests 110A-110N may maintain a set of virtual machine control blocks (VMCBs) 122. There may be one VMCB 122 for each guest 110A-110N. In one embodiment, there may be one VMCB 122 for each virtual CPU (vCPU) in each guest 110A-110N. While the VMCBs 122 are shown as part of the VMM 118 for illustration in FIG. 1, the VMCBs 122 may be stored in memory, processor registers, and/or on non-volatile media in the host hardware 120 in other embodiments.

The host hardware 120 generally includes all of the hardware included in the computer system 100. In various embodiments, the host hardware 120 may include one or more processors, memory, peripheral devices, storage, and other circuitry used to connect together the preceding components. For example, personal computer (PC)-style systems may include a Northbridge coupling the processors, the memory, and a graphics device that uses an interface such as a peripheral component interface (PCI) Express Interface. Additionally, the Northbridge may couple to a peripheral bus such as the PCI bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. Each node may also include a Northbridge. The host bridge may be used to couple, via HT links, to peripheral devices in a daisy chain fashion. Alternatively, many of the components may be included on a single device such as, for example, a single device that integrates one or more processors, Northbridge functionality and a graphics device. Any desired circuitry/host hardware structure may be used.

The VMM 118 may be configured to provide the virtualization for each of the guests 110A-110N. The VMM 118 may also be responsible for scheduling the guests 110A-110N for execution on the host hardware 120 (and more particularly, vCPUs within the guests if the guests include more than one vCPU). The VMM 118 may be configured to use the hardware support provided in the host hardware 120 for virtualization. For example, the processors may provide hardware support for virtualization, including hardware to intercept events and exit the guest to the VMM 118 for notification purposes. The device interrupt manager and/or guest interrupt control units in processors may be hardware provided to support virtualization as well.

In some embodiments, the VMM 118 may be implemented as a "thin" standalone software program that executes on the host hardware 120 and provides the virtualization for the guests 110A-110N. Such a VMM implementation may sometimes be referred to as a "hypervisor". In other embodiments, the VMM 118 may be integrated into or execute on a host OS. In such embodiments, the VMM 118 may rely on the host OS, including any drivers in the host OS, platform system management mode (SMM) code provided by the system BIOS, etc. Thus, the host OS components (and various lower-level components such as the platform SMM code) execute directly on the host hardware 120 and are not virtualized by the VMM 118. The VMM 118 and the host OS (if included) may together be referred to as the host, in one embodiment. Generally, the host may include any code that is in direct control of the host hardware 120 during use. For example, the host may be the VMM 118, the VMM 118 in conjunction with the host OS, or the host OS alone (e.g., in a non-virtualized environment).

In various embodiments, the VMM 118 may support full virtualization, paravirtualization, or both. Furthermore, in some embodiments, the VMM 118 may concurrently execute guests that are paravirtualized and guests that are fully virtualized. With full virtualization, the guest 110A-110N is not aware that virtualization is occurring. Each guest 110A-110N may have contiguous, zero based memory in its virtual machine, and the VMM 118 may use shadow page tables or nested page tables to control access to the host physical address space. The shadow page tables may remap from guest virtual addresses to host physical addresses (effectively remapping the guest "physical address" assigned by memory management software in the guest 110A-110N to host physical address), while nested page tables may receive the guest physical address as an input and map to the host physical address. Using the shadow page tables or nested page tables for each guest 110A-110N, the VMM 118 may ensure that guests do not access other guests' physical memory in the host hardware 120.

With paravirtualization, guests 110A-110N may be at least partially VM-aware. Such guests 110A-110N may negotiate for memory pages with the VMM 118, and thus remapping guest physical addresses to host physical addresses may not be required. In one embodiment, in paravirtualization, guests 110A-110N may be permitted to directly interact with peripheral devices in the host hardware 120. At any given time, a peripheral device may be "owned" by a guest or guests 110A-110N. In one implementation, for example, a peripheral device may be mapped into a protection domain with one or more guests 110A-110N that currently own that peripheral device. There may also be a protection mechanism to prevent devices in a protection domain from reading/writing pages allocated to a guest in another protection domain.

As mentioned previously, a VMCB 122 may be maintained for each guest 110A-110N and/or each vCPU in the guest. The VMCB 122 may generally include a data structure stored in a storage area that is allocated for the corresponding guest 110A-110N. In one embodiment, the VMCB 122 may include a page of memory, although other embodiments may use larger or smaller memory areas and/or may use storage on other media such as non-volatile storage. In one embodiment, the VMCB 122 may include the guest's processor state, which may be loaded into a processor in the host hardware 120 when the guest is scheduled to execute and may be stored back to the VMCB 122 when the guest exits (either due to completing its scheduled time, or due to an intercept or other event that the processor detects for exiting the guest). In one embodiment, when the guest exits, the guest's processor state may be encrypted prior to being stored to VMCB 122, and the guest's encrypted processor state may be decrypted before the state is loaded into the processor when the guest commences execution.

In one embodiment, the VMM 118 may also have an area of memory allocated to store the processor state corresponding to the VMM 118. When the guest is scheduled for execution, the processor state corresponding to the VMM 118 may be saved in this area. In one embodiment, an instruction or utility (e.g., VMRUN) may be used to start execution of a guest. When the guest exits to the VMM 118, the stored processor state may be reloaded to permit the VMM 118 to continue execution. In one implementation, for example, the processor may implement a register (e.g., a model specific register, or MSR) to store the address of the VMM 118 save area.

Additionally, the VMCB 122 may include an intercept configuration that identifies fault or trap events that are enabled for the guest, and the mechanism for exiting the guest if an enabled event is detected. In one embodiment, the intercept configuration may include a set of intercept indications, one indication for each event that the processor supports. The intercept indication may indicate whether or not the processor is to intercept the corresponding event (or, viewed in another way, whether or not the intercept is enabled). As used herein, a "fault" event is intercepted in a guest if, should the event be attempted in the guest, the processor exits the guest for processing of the event (i.e., before the instruction is executed). Accordingly, a fault intercept takes place before the execution of the instruction that triggered the fault. The saved guest state thus does not include the effects of executing that instruction.

As used herein, a "trap" event is intercepted in a guest if, should the event occur in the guest, the processor exits the guest after the event is detected (i.e., after the instruction is executed). Accordingly, a trap intercept takes place after the execution of the instruction that triggered the trap. The saved guest state thus includes the effects of executing that instruction. The processor may then store an indication of the detected event and exit to VMM 118 so that VMM 118 may be notified of the occurrence of the event. The VMM 118 may configure the processor to intercept those events that the VMM 118 wishes to be notified about when performed by a guest 110A-110N. Events may include instructions, interrupts, exceptions, faults, traps, and/or any other actions that may occur during guest execution.

For example, in one embodiment, if the processor detects a guest about to execute a write to a processor register (e.g., control register, debug register), the processor may allow the guest to perform the write. The processor may then copy the new value of the processor register (after the write has been performed) to a separate location, exit the guest, and then transfer control to VMM 118. In one implementation, the register write may be implemented at least partially in microcode. Microcode may be instructions that are stored in a non-volatile memory within the processor, that are invoked by the processor circuitry in response to detecting certain instructions or other operations that are implemented via microcode routines. The microcode may thus be dispatched for execution in the processor to perform the implemented operation.

In one embodiment, the VMCB 122 may further include other control bits that may cause the processor to perform certain actions upon loading the VMCB 122. For example, the control bits may include indications to flush the TLB in the processor. Other control bits may specify the execution environment for the guest (e.g., interrupt handling modes, an address space identifier for the guest). Still other control bits may be used to communicate an exit code describing why the guest exited, etc. Additionally, in one embodiment, the VMCB 122 may include a location for storing the new value written to a processor register by a guest. VMM 118 may access this location to read the new value to determine if the new value is acceptable. If the new value is acceptable, VMM 118 may allow the guest to continue to run. If the new value is unacceptable, VMM 118 may suggest an alternate value to the guest or VMM 118 may terminate the guest. In various embodiments, terminating the guest may simply mean that the hypervisor does not schedule the guest again.

Generally, a "guest" may include any one or more software programs that are to be virtualized for execution in the computer system 100. A guest may include at least some code that executes in privileged mode, and thus expects to have full control over the computer system on which it is executing. As mentioned previously, guest 110A is an example in which the guest includes a guest OS 112. The guest OS 112 may be any OS, such as Windows®, UNIX®, Linux®, etc. The guests 110A-110N may also execute non-OS privileged code.

It is noted that the letter "N" when used herein in reference numerals such as 110N is meant to generically indicate any number of elements bearing that reference numeral (e.g., any number of guests 110A-110N, including one guest). Additionally, different reference numerals that use the letter "N" (e.g., 110N and 114N) are not intended to indicate equal numbers of the different elements are provided (e.g., the number of guests 110A-110N may differ from the number of applications 114A-114N) unless otherwise noted.

Figure 2:
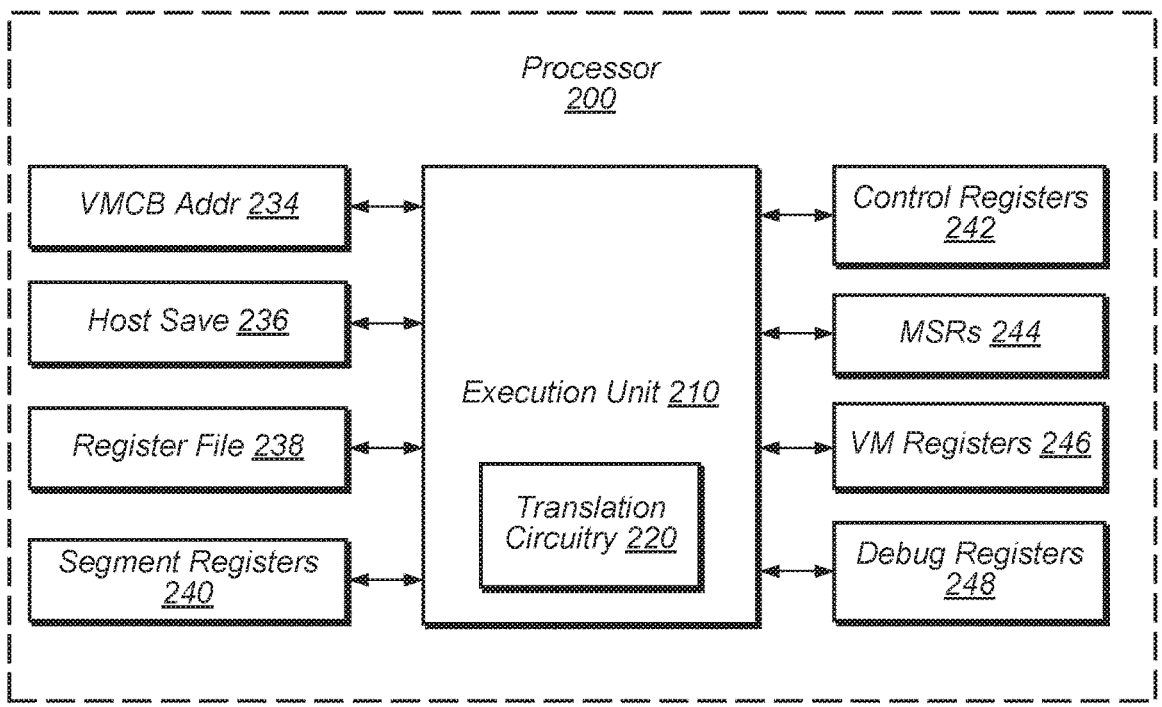
FIG. 2 is a block diagram of one embodiment of a processor.

Turning now to FIG. 2, a block diagram of one embodiment of a processor 200 that may be included in the host hardware 120 is shown. In the illustrated embodiment, the processor 200 includes an execution unit 210, a VMCB address register 234, a host save register 236, a register file 238, a set of segment registers 240, a set of control registers 242, a set of model specific registers (MSRs) 244, a set of virtual machine (VM) registers 246, and a set of debug registers 248. The execution unit 210 is coupled to each of the registers 234, 236, 238, 240, 242, 244, 246, and 248.

Generally, the execution unit 210 is configured to execute the instructions defined in the instruction set architecture implemented by the processor 200 (e.g., the x86 instruction set architecture, including AMD64™ extensions, in some embodiments). The execution unit 210 may employ any construction and may include any number of execution units (e.g., processor cores). For example, the execution unit 210 may be a superpipelined core, a superscalar core, or a combination thereof in various embodiments. Alternatively, the execution unit 210 may be a scalar core, a pipelined core, a non-pipelined core, etc. The execution unit 210 may employ out of order speculative execution or in order execution in various embodiments. The execution unit 210 may include microcoding for one or more instructions or other functions, in combination with any of the above constructions. The execution unit 210 may also include translation circuitry 220 that performs address translation according to an address translation mechanism defined for the processor 200. In one embodiment, the address translation mechanism may include nested paging to support guests. In nested paging, the processor may support a set of page tables for each guest (translating from guest virtual to guest physical addresses) and another set of page tables (translating from guest physical to host physical addresses). Thus, a tablewalk initiated during guest execution may walk two sets of page tables when nested paging is used.

In one embodiment, the translation circuitry 220 may include a translation lookaside buffer (TLB) configured to cache the results of translations. The TLB may store the portion of the input address that gets translated (guest virtual or guest physical) and the corresponding portion of the resulting translated address (host physical). The portion may be the input/output address with the exception of the least significant bits that form an offset within the page. The page is the unit of translation, and may vary in size.

When executing a VMRUN instruction, the execution unit 210 may save the address of the VMCB identified by the VMRUN instruction in the VMCB address register 234. Subsequently, during a guest exit, the execution unit 210 may save the processor state (or a portion thereof) to the VMCB indicated by the VMCB address register 234. The host save register 236 may store an address of a host save area in which host processor state (e.g., corresponding to the VMM 118) may be saved. The execution unit 210 may save processor state in the host save area during execution of the VMRUN instruction, and may load processor state from the host save area during a guest exit to the VMM 118. In one embodiment, processor 200 may use an instruction or utility (e.g., a VMEXIT instruction) to exit from a guest to the host context.

The control registers 242 may include a variety of control registers that describe the general operating mode of the processor 200. The control registers, for example, may include various control bits that control protected mode, whether or not paging is enabled, various paging/protected mode options, interrupt enable indications and handling, base addresses of various tables used by the processor such as the segment descriptor tables, the page tables, etc. The definition of the control registers 242 varies from instruction set architecture to instruction set architecture. In embodiments implementing the x86 instruction set architecture (including AMD64™ extensions, if desired), the control registers 242 may include CR0, CR3, CR4, the local descriptor table register (LDTR), the global descriptor table register (GDTR), the interrupt descriptor table register (IDTR), the extended feature enable register (EFER), the task register (TR), the system call registers (STAR, LSTAR, CSTAR, SFMASK, etc.), etc.

The MSRs 244 may include one or more registers that are implementation dependent. That is, the instruction set architecture may permit a given implementation to define any set of MSRs 244 that may be desirable for that implementation. The VM registers 246 include one or more registers that are included in the processor 200 to provide virtual machine support (that is, to support virtualization for the guests 110A-110N). The VMCB address register 234 and the host save register 236 may be considered to be VM registers 246, but have been shown separately in FIG. 2 to illustrate the world switch functionality of the processor 200. For example, the VM registers 246 may include registers that may be loaded with a virtual interrupt state to permit an interrupt to be injected into a guest. The VM registers 246 may also include an intercept register or registers. The intercept register or registers may store the intercept configuration. The execution unit 210 may be configured to monitor for various intercepts and/or traps as indicated in the intercept register. The intercept register may be loaded from the VMCB 122 of a guest 110A-110N when execution of that guest 110A-110N is initiated (e.g., using the VMRUN instruction described above). Other VM registers 246 may be included to virtualize various other processor states, system resources, etc. In some embodiments, some or all of the VM registers 246 may be defined as MSRs. Debug registers 248 include registers used by processor 200 for program debugging. In embodiments implementing the x86 instruction set architecture, debug registers 248 may include DR0-DR7.

As used herein, the term register refers to any storage location implemented in the processor that is addressable (or otherwise accessible) using an instruction. Registers may be implemented in various fashions. For example, registers may be implemented as any sort of clocked storage devices such as flip-flops, latches, etc. Registers may also be implemented as memory arrays, where a register address may be used to select an entry in the array. The register file 238 may be implemented in such a fashion, in some embodiments. Any combination of implementations may be used in various embodiments of the processor 200. The various registers 234, 236, 238, 240, 242, 244, 246, and 248, may be part of the processor state in one embodiment. Any other registers may be implemented in other embodiments that may be part of the processor state, as desired.

Figure 3:
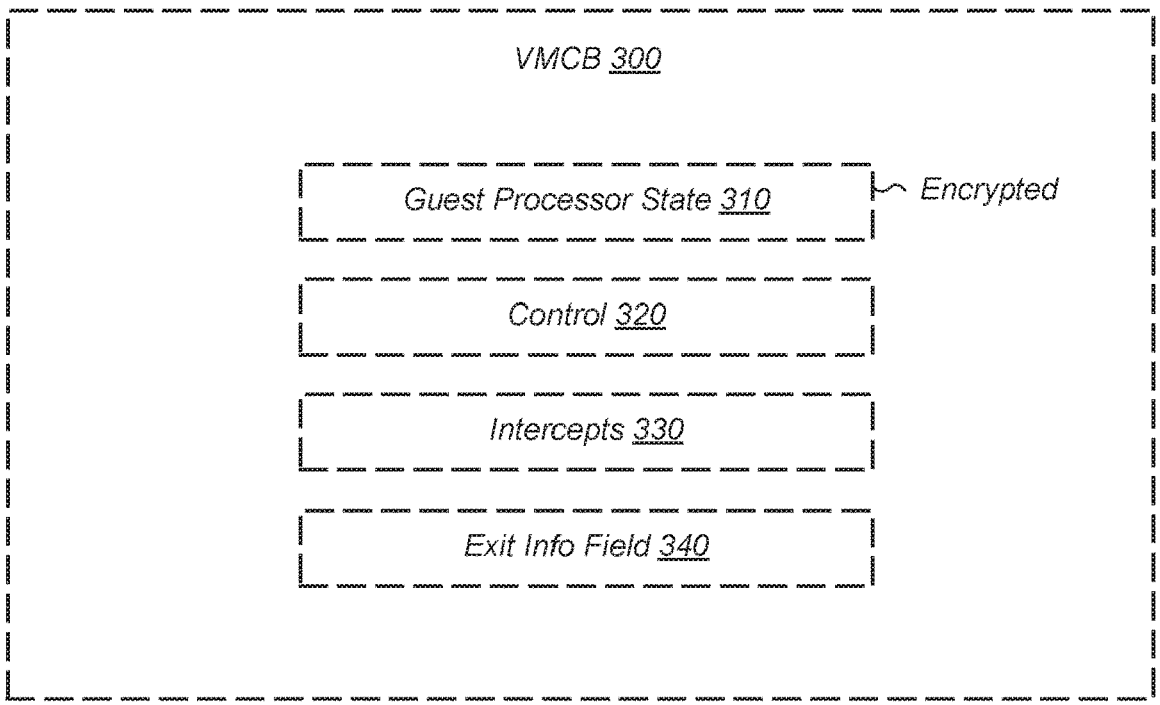
FIG. 3 is a block diagram of one embodiment of a VMCB.

Referring now to FIG. 3, a block diagram of one embodiment of a VMCB 300 is shown. In one embodiment, the contents of VMCB 300 may be included within each of the VMCBs 122 of FIG. 1. The VMCB 122 may include a guest processor state 310, control data 320, intercepts 330, and exit info field 340. The guest processor state 310 may include an architected state that corresponds to the processor state at the point at which the guest last exited. The guest processor state 310 may also include an implementation-specific state (e.g., model specific registers). For example, the guest processor state 310 may include an implementation-specific state and/or architected state that is considered part of the processor's context. The guest processor state 310 may correspond to an initial state of the processor if the guest has not yet executed. The processor 200 may load the state of the processor 200 from the guest processor state 310 during execution of the VMRUN instruction. The processor 200 may save the state from the processor 200 to the guest processor state 310 during the guest exit. In one embodiment, the guest processor state 310 may be defined to store all of the processor state, while in other embodiments, the guest processor state 310 may be defined to store a portion of the processor state. Processor state not stored in the guest processor state 310 may be saved by the VMM 118 in other memory locations (or may be recreated by the VMM 118). Any subset of the processor state may be included in the guest processor state 310. In various embodiments, the guest processor state 310 may be encrypted to prevent unauthorized access by the VMM 118 and/or other guests.

The control data 320 may include any desired control information to be used when execution of the corresponding guest is initiated or exited. The control data 320 may include a guest exit code written by the processor 200 upon guest exit to indicate the reason for guest exit. The intercepts 330 may specify which events are enabled for fault or trap. The intercepts 330 may define exits to the VMM 118, such as by using the VMEXIT mechanism. Various intercepts may be defined in various embodiments. In one embodiment, at least some of the intercepts may be defined as intercept indications in the intercepts 330. Each indication may, e.g., be a bit which may enable the intercept when set or disable the intercept when clear. Other embodiments may assign the opposite meanings to the states of the bit or may use other indications. There may be one intercept indication in the intercepts 330 for each intercept event.

When a trap intercept of intercepts 330 is triggered, the processor may execute the instruction which caused the trap prior to exiting the guest. The processor may store an updated value of a register or other indication of the instruction which caused the trap in exit info field 340. In one embodiment, the exit info field 340 may correspond to the EXITINFO1 or EXITINFO2 field of VMCB 300. In other embodiments, the exit info field 340 may be any data structure that is accessible to the VMM 118.

After the processor has stored an indication of the instruction or other action which caused the trap in exit info field 340, the processor may exit to the VMM 118. The VMM 118 may read the value from exit info field 340 and determine if the guest should be allowed to continue based on this value. For example, if a guest changes the value of a control or debug register, the VMM 118 may determine if the new value is acceptable. If the new value is not acceptable, the VMM 118 may recommend an alternate value to the guest, or the VMM 118 may send a request to the guest to change the value. If the guest agrees with the alternate value or if the guest generates a different value which is acceptable, then the guest may be allowed to continue to execute. Otherwise, if an agreement cannot be reached, the VMM 118 may terminate the guest.

Figure 4:
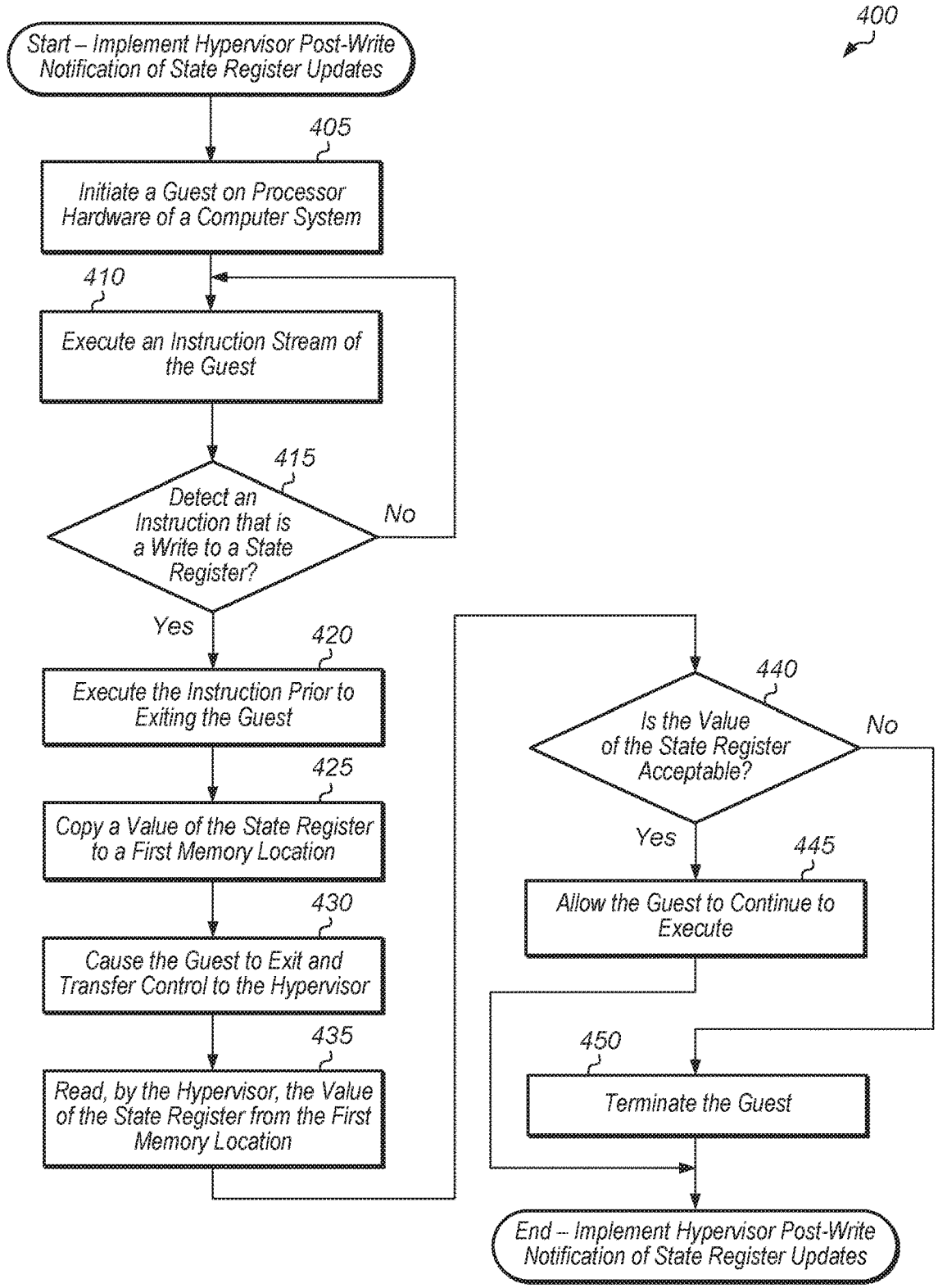
FIG. 4 is a generalized flow diagram illustrating one embodiment of a method for implementing hypervisor post-write notification of processor register updates.

Turning now to FIG. 4, one embodiment of a method 400 for implementing hypervisor post-write notification of state register updates is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 400.

A guest may be initiated on processor hardware of a computer system (block 405). In one embodiment, the guest may be initiated with the VMRUN instruction. Next, the processor hardware may execute an instruction stream of the guest (block 410). When executing an instruction for the guest, the processor may determine if the instruction is a write to a state register (e.g., control register, debug register) (conditional block 415). In one embodiment, instructions such as writes to state registers or other instructions which will change the architectural state of the processor may be indicated in a vector stored in the VMCB of the guest. In another embodiment, the processor may determine if the instruction will make a change that will affect the hypervisor and/or which the hypervisor has indicated it should be notified about in conditional block 415.

If the instruction is not a write to a state register (conditional block 415, "no" leg), then method 400 may return to block 410 and continue executing the guest's instruction stream. If the instruction is a write to a state register (conditional block 415, "yes" leg), then the processor may execute the instruction prior to exiting the guest (block 420). Next, after executing the instruction, the processor may copy a value of the state register to a first memory location (block 425). The first memory location may be in a memory/storage location which is accessible to the hypervisor. For example, if the instruction is a write to a control register (e.g., CR0), the processor may copy the new value of the control register to a location in memory. In one embodiment, the first memory location may be the EXITINFO1 or EXITINFO2 field of the VMCB. In some embodiments, the processor may only copy a subset of the new value (i.e., only the changed bits) of the register rather than copying the value of the entire register to the first memory location.

Then, after block 425, the processor may cause the guest to exit and transfer control to the hypervisor (block 430). Then, the hypervisor may read the value of the state register from the first memory location (block 435). If the hypervisor determines that the value of the state register is acceptable (conditional block 440, "yes" leg), then the hypervisor may allow the guest to continue to execute (block 445). If the hypervisor determines that the value of the state register is unacceptable (conditional block 440, "no" leg), then the hypervisor may terminate the guest (block 450). Alternatively, the hypervisor may suggest an alternate value to the guest in block 450 rather than terminating the guest. If the guest agrees to use the alternate value, then the guest may be allowed to continue to execute. After blocks 445 and 450, method 400 may end.

Figure 5:
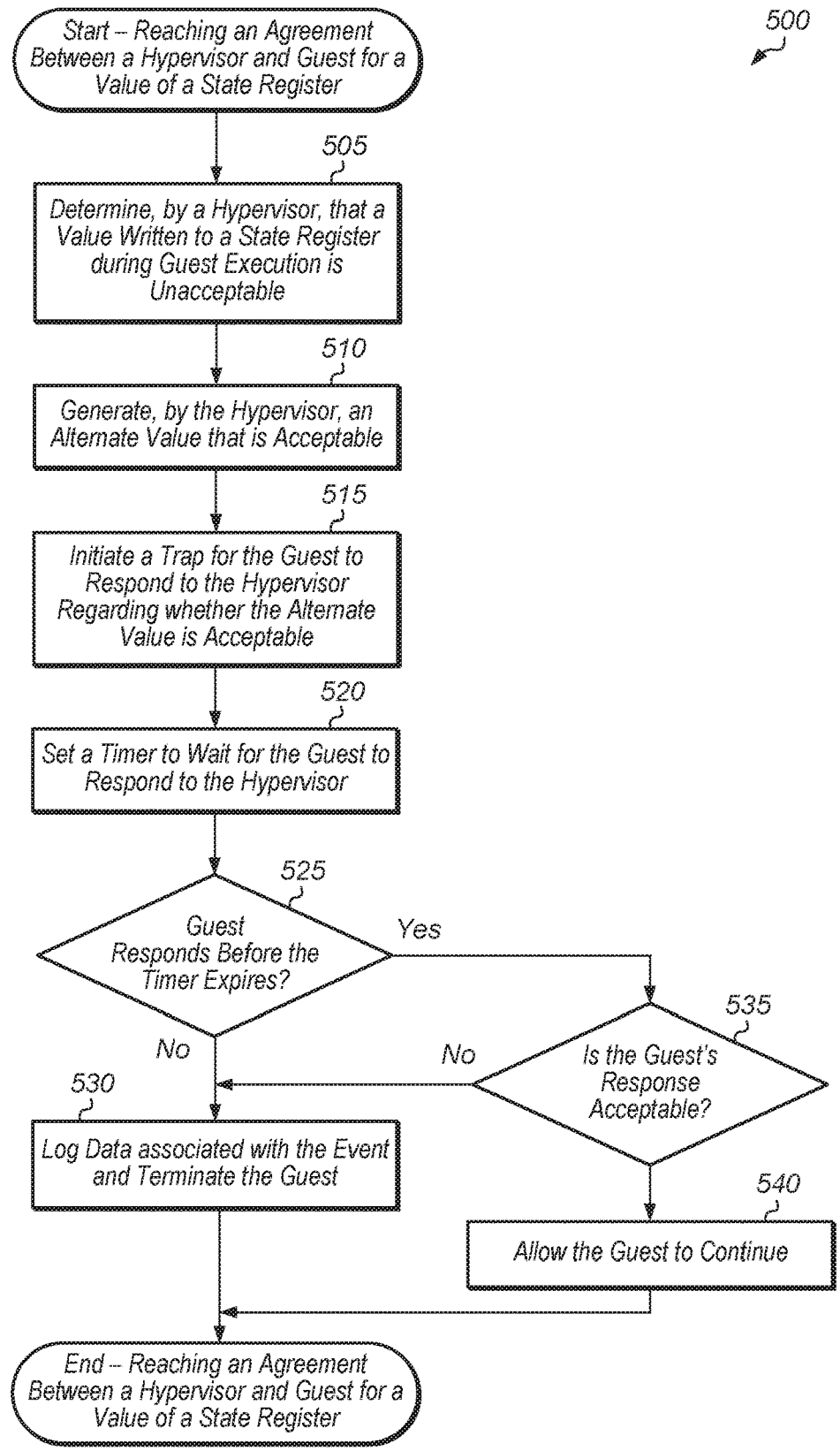
FIG. 5 is a generalized flow diagram illustrating one embodiment of a method for reaching an agreement between a hypervisor and guest on an alternate value of a processor register.

Referring now to FIG. 5, one embodiment of a method 500 for reaching an agreement between a hypervisor and a guest on an alternate value of a state register is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 500.

A hypervisor may determine that a value written to a state register by a guest during guest execution is unacceptable (block 505). In response to determining that the value written to the state register is unacceptable, the hypervisor may generate an alternate value that is acceptable (block 510). Next, the hypervisor may initiate a trap for the guest to respond to the hypervisor regarding whether the alternate value is acceptable to the guest (block 515). Then, the hypervisor may set a timer to wait for the guest to respond to the hypervisor about the alternate value (block 520). The duration of the timer may vary from embodiment to embodiment.

If the guest does not respond to the hypervisor before the timer expires (conditional block 525, "no" leg), then the hypervisor may log data associated with the event and then the hypervisor may terminate the guest (block 530). The hypervisor may share the log data with the owner of the guest to notify the owner of the reason why the guest was prevented from executing further. If the guest responds to the hypervisor before the timer expires (conditional block 525, "yes" leg), then the hypervisor may determine if the guest's response is acceptable (conditional block 535). The guest's response may be acceptable if the guest agrees with the alternate value recommended by the hypervisor or if the guest suggests a further value for the state register which the hypervisor determines is acceptable. If guest's response is acceptable (conditional block 535, "yes" leg), then the hypervisor may allow the guest to continue to execute (block 540). If the guest's response is unacceptable (conditional block 535, "no" leg), then the hypervisor may log data associated with the event and then the hypervisor may terminate the guest (block 530). Alternatively, if the guest's response is unacceptable in conditional block 530, method 500 may return to block 510 and the hypervisor may generate an alternate value. After blocks 530 and 540, method 500 may end.

Figure 6:
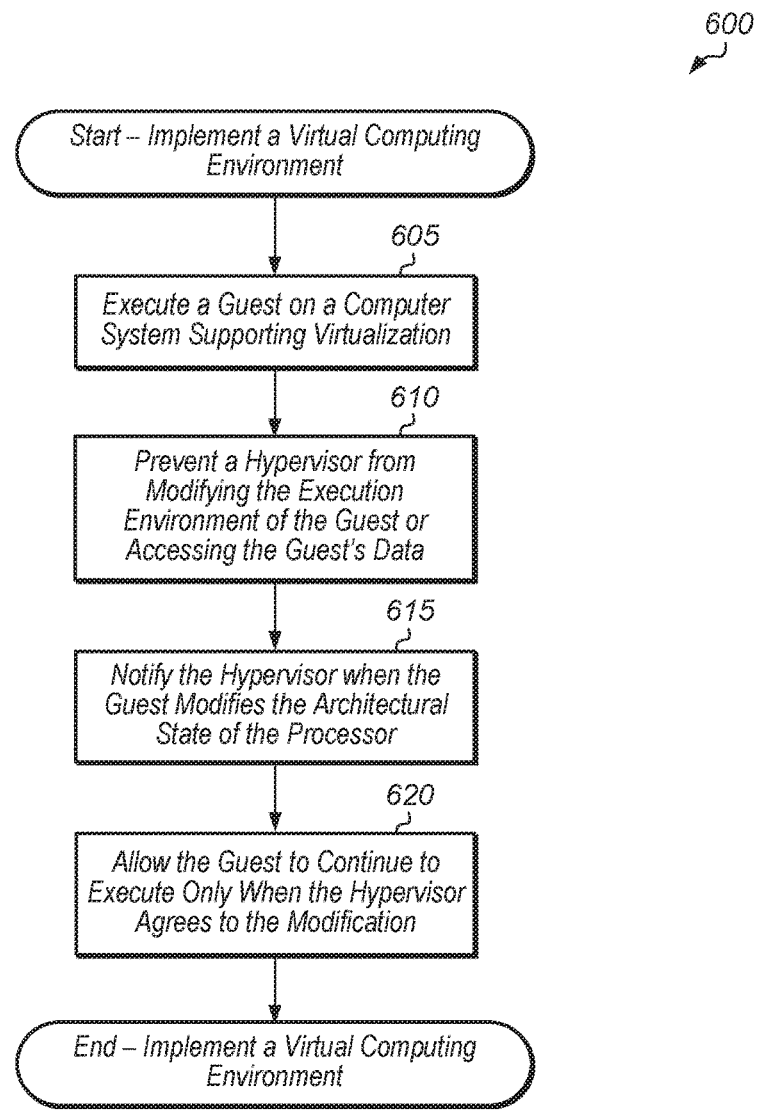
FIG. 6 is a generalized flow diagram illustrating one embodiment of a method for implementing a virtualization environment.

Turning now to FIG. 6, one embodiment of a method 600 for implementing a virtual computing environment is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 600.

A guest may execute on a computer system supporting virtualization (block 605). A hypervisor may be prevented from modifying the execution environment of the guest or accessing the guest's data (block 610). In one embodiment, the guest's data may be encrypted, and the guest's processor state may also be encrypted when the guest exits so as to prevent the hypervisor from accessing or modifying the guest's processor state or data. The processor hardware of the computer system may be configured to notify the hypervisor when the guest modifies the architectural state of the processor (block 615). In response to receiving the notification, the hypervisor may allow the guest to continue to execute only when the hypervisor agrees to the modification (block 620). After block 620, method 600 may end. By utilizing method 600, a computer system is able to support virtualization while protecting guests in environments where the hypervisor is not fully trusted (e.g., in cloud computing environments).

Figure 7:
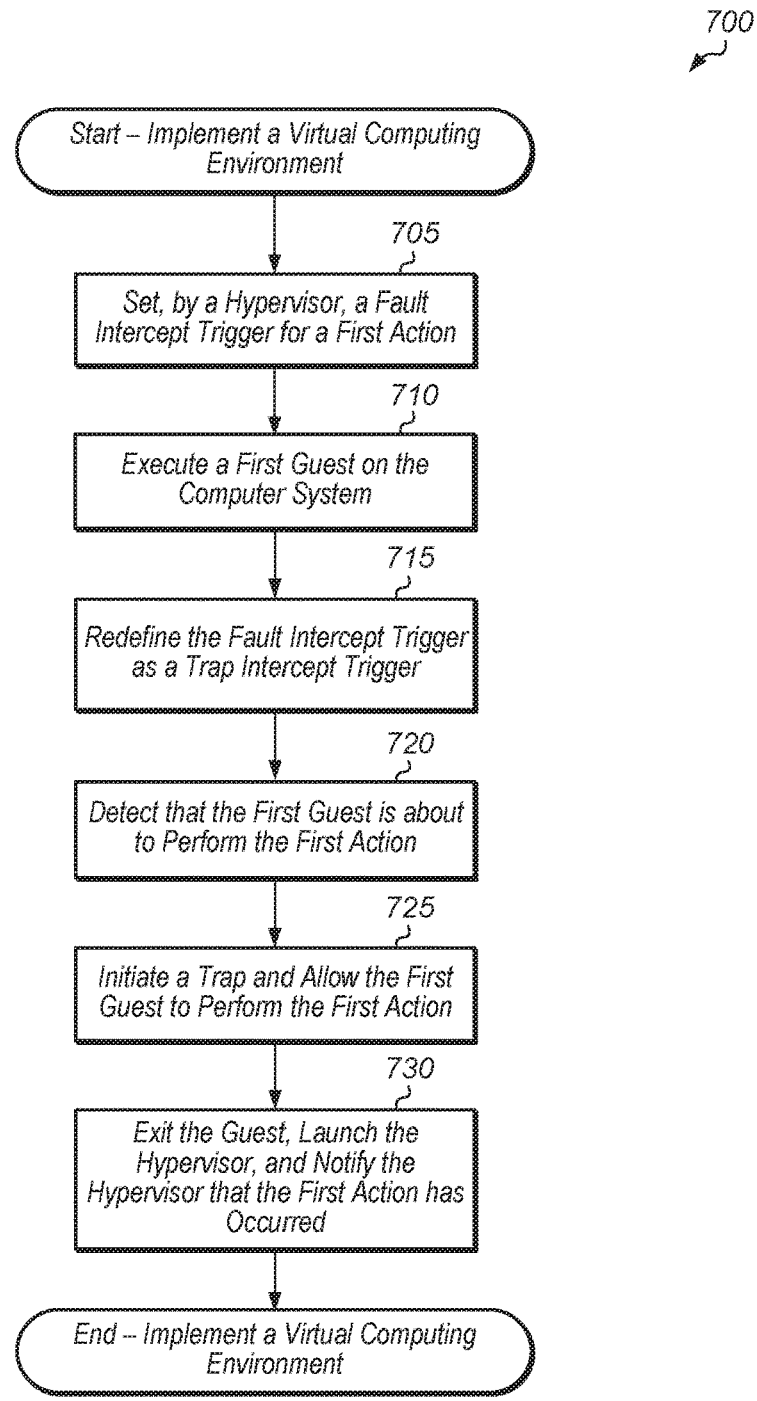
FIG. 7 is a generalized flow diagram illustrating another embodiment of a method for implementing a virtualization environment.

Referring now to FIG. 7, another embodiment of a method 700 for implementing a virtual computing environment is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 700.

In a virtualized computer system, a hypervisor may set a fault intercept trigger for a first action (block 705). In one embodiment, the first action may be a write to a control or debug register of a processor of the computer system. The fault intercept trigger means that if the first action is detected during guest execution, the first action should be intercepted prior to the first action being performed by the guest. In one embodiment, the fault intercept trigger may be stored in the intercepts field of the VMCB of one or more guests. By setting the fault intercept trigger for the first action, the hypervisor is indicating that guests are not allowed to perform the first action.

Next, a first guest may execute on the computer system (block 710). In response to executing the first guest, the fault intercept trigger for the first action may be redefined as a trap intercept trigger (block 715). A trap will allow the first guest to perform the first action prior to exiting to the hypervisor when the first action is detected. Next, the computer system may detect that the first guest is about to perform the first action (block 720). In response to detecting the first action and reading the trap intercept trigger indication associated with the first action, the computer system may initiate a trap and allow the first guest to perform the first action (block 725). Next, the computer system may exit the guest, launch the hypervisor, and notify the hypervisor that the first action has occurred (block 730). After block 730, method 700 may end. In response to receiving the notification in block 730, the hypervisor may respond using any of various techniques (e.g., as described in method 500 of FIG. 5).

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
one or more registers;
an execution unit coupled to the one or more registers; and
a hypervisor configured to grant permission to a guest program to execute code on the processor;
wherein the processor is configured to:
    detect an instruction of a first guest program that will change an architectural state of the processor;
    execute the instruction to perform a write to a first register prior to exiting the first guest program, wherein the hypervisor does not have access to the first register;
    in response to executing the instruction to perform the write to the first register:
        prior to exiting the first guest program:
            copy a value of the first register to a given location accessible by the hypervisor; and
            save a state of the first guest program that includes the value of the first register as modified by execution of the write instruction; and
        exit the first guest program and switch execution to the hypervisor;
    wherein subsequent to the first guest program executing the instruction, the hypervisor is configured to:
        read the value stored in the given location; and
        determine whether the first guest program is permitted to resume execution based on the value copied to the given location.

2. The processor as recited in claim 1, wherein the processor is further configured to:
prior to exiting the first guest program, store an indication that the instruction has been detected;
exit the first guest program subsequent to copying the value of the first register to the given location; and
notify the hypervisor of the write to the first register.

3. The processor as recited in claim 1, wherein the hypervisor is configured to set a fault intercept trigger for a first action, wherein the fault intercept trigger indicates that if the first action is detected during guest execution, the first action should be intercepted prior to being performed, and wherein the processor is further configured to:
in response to initiating execution of the first guest program, redefine the fault intercept trigger as a trap intercept trigger; and after redefining the fault intercept trigger as the trap intercept trigger and in response to detecting the first action, initiate a trap and allow the first guest program to perform the first action, wherein the first action is the write to the first register.

4. The processor as recited in claim 1, wherein subsequent to reading the value stored in the given location, the hypervisor is configured to send a request to the first guest program to change the value responsive to determining that the value is unacceptable.

5. The processor as recited in claim 4, wherein the hypervisor is configured to allow the first guest program to continue to run responsive to the first guest program generating a different value that is acceptable.

6. The processor as recited in claim 1, wherein subsequent to reading the value stored in the given location, the hypervisor is configured to:
  recommend an alternate value to the first guest program for the first register responsive to determining the value is unacceptable; and
  allow the first guest program to resume execution if the first guest program agrees with the alternate value.

7. A method comprising:
  executing a hypervisor, wherein the hypervisor is configured to grant permission to a guest program to execute code on a processor;
  detecting an instruction of a first guest program that will change an architectural state of the processor;
  executing the instruction to perform a write to a first register prior to exiting the first guest program, wherein the hypervisor does not have access to the first register;
  in response to executing the instruction to perform the write to the first register:
    prior to exiting the first guest program:
      copying a value of the first register to a given location accessible by the hypervisor; and
      saving a state of the first guest program that includes the value of the first register as modified by execution of the write instruction; and
    exiting the first guest program and switching execution to the hypervisor;
  wherein subsequent to the first guest program executing the instruction, the hypervisor:
    reading the value stored in the given location; and
    determining whether the first guest program is permitted to resume execution based on the value copied to the given location.

8. The method as recited in claim 7, further comprising:
  prior to exiting the first guest program, storing an indication that the instruction has been detected;
  exiting the first guest program subsequent to copying the value of the first register to the given location; and
  notifying the hypervisor of the write to the first register.

9. The method as recited in claim 7, wherein the hypervisor is configured to set a fault intercept trigger for a first action, wherein the fault intercept trigger indicates that if the first action is detected during guest execution, the first action should be intercepted prior to being performed, and wherein the method further comprising:
  in response to initiating execution of the first guest program, redefining the fault intercept trigger as a trap intercept trigger; and
  after redefining the fault intercept trigger as the trap intercept trigger and in response to detecting the first action, initiating a trap and allowing the first guest program to perform the first action, wherein the first action is the write to the first register.

10. The method as recited in claim 7, wherein subsequent to reading the value stored in the given location, the method further comprising the hypervisor sending a request to the first guest program to change the value responsive to determining that the value is unacceptable.

11. The method as recited in claim 10, further comprising allowing the first guest program to continue to run responsive to the first guest program generating a different value that is acceptable.

12. The method as recited in claim 7, wherein subsequent to reading the value stored in the given location, the method further comprises:
  recommending an alternate value to the first guest program for the first register responsive to determining the value is unacceptable; and
  allowing the first guest program to resume execution if the first guest program agrees with the alternate value.

13. A system comprising:
  a memory; and
  a processor comprising:
    one or more registers;
    an execution unit; and
    a hypervisor configured to grant permission to a guest program to execute code on the processor;
  wherein the processor is configured to:
    detect an instruction of a first guest program that will change an architectural state of the processor;
    execute the instruction to perform a write to a first register prior to exiting the first guest program, wherein the hypervisor does not have access to the first register;
    in response to executing the instruction to perform the write to the first register:
      prior to exiting the first guest program:
        copy a value of the first register to a given location accessible by the hypervisor; and
        save a state of the first guest program that includes the value of the first register as modified by execution of the write instruction; and
      exit the first guest program and switch execution to the hypervisor;
    wherein subsequent to the first guest program executing the instruction, the hypervisor is configured to:
      read the value stored in the given location; and
      determine whether the first guest program is permitted to resume execution based on the value copied to the given location.

14. The system as recited in claim 13, wherein the processor is further configured to:
  prior to exiting the first guest program, store an indication that the instruction has been detected;
  exit the first guest program subsequent to copying the value of the first register to the given location; and
  notify the hypervisor of the write to the first register.

15. The system as recited in claim 13, wherein the hypervisor is configured to set a fault intercept trigger for a first action, wherein the fault intercept trigger indicates that if the first action is detected during guest execution, the first action should be intercepted prior to being performed, and wherein the processor is further configured to:
  in response to initiating execution of the first guest program, redefine the fault intercept trigger as a trap intercept trigger; and
  after redefining the fault intercept trigger as the trap intercept trigger and in response to detecting the first action, initiate a trap and allow the first guest program to perform the first action, wherein the first action is the write to the first register.

16. The system as recited in claim 13, wherein subsequent to reading the value stored in the given location, the hypervisor is configured to send a request to the first guest program to change the value responsive to determining that the value is unacceptable.

17. The system as recited in claim 16, wherein the hypervisor is configured to allow the first guest program to continue to run responsive to the first guest program generating a different value that is acceptable.

* * * * *